No. 787,093. Patented April 11, 1905.

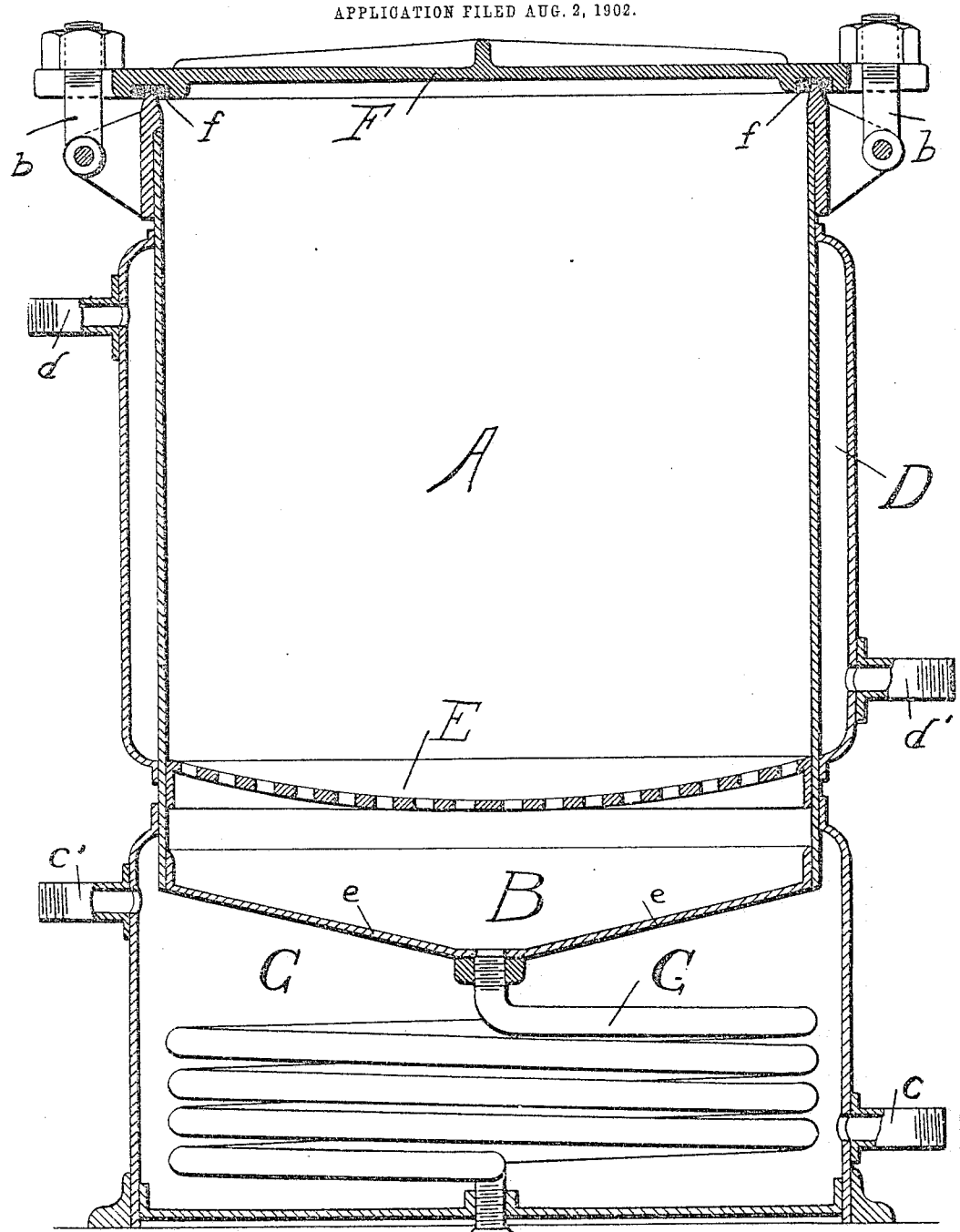

UNITED STATES PATENT OFFICE.

EMIL GATHMANN, OF WASHINGTON, DISTRICT OF COLUMBIA, ASSIGNOR TO GEORGE WHITMAN McMULLEN, OF PICTON, CANADA.

PROCESS OF DRYING VEGETABLE, MINERAL, ANIMAL, AND COMPOUND SUBSTANCES.

SPECIFICATION forming part of Letters Patent No. 787,093, dated April 11, 1905.

Application filed August 2, 1902. Serial No. 118,168.

*To all whom it may concern:*

Be it known that I, EMIL GATHMANN, a citizen of the United States, residing in Washington, in the District of Columbia, have invented a new and useful Improvement in Processes of Drying Vegetable, Mineral, Animal, and Compound Substances, of which the following is a specification.

My invention relates to an improved process for extracting moisture or liquid from any of the above substances.

Instead of the slow process of air-drying or the quicker but costly and often damaging one of heat alone I employ a simple and effective means, as hereinafter described, which does the work quickly, cheaply, and without any damage to the materials being dried.

My process may be described as follows: The substance to be dried is placed within a sealed vessel or chamber. The upper part of the vessel is heated, while the lower part is kept comparatively cool, or the artificial cooling may be applied to the lower part of the vessel and the upper part at atmospheric temperature. An essential feature of my invention is the effect produced in drying by two different temperatures, the temperature in the upper portion of the vessel being distinctly higher than that in the lower part. The applied heat on or in the upper portion causes the vaporization of the liquid contained in the substance to be dried, and must be sufficient to do so. This vaporization may be aided by a minus pressure of the vacuum. The atmosphere within the vessel soon becomes too heavily charged with moisture, and the surplus moisture falls to the bottom of the vessel, which is kept cool by any artificial means. The result is a speedy extraction of the liquid from the material to be dried and its precipitation to the cool part of the chamber, from which it may be withdrawn or allowed to escape. The upper portion of the vessel should be practically vapor-tight to enable me to carry out the essential feature of maintaining the porosity of the material to be dried during the whole operation. The usual kiln or open-air drying of porous materials, as is well known, acts on the surface first and closes or partly closes the outer pores and renders difficult the exit of moisture from the interior of the mass. By my system I at once charge the air in the closed upper portion with moisture, and no precipitation of moisture to the lower chamber will take place until the air about the material shall have become supercharged with it. Thus the surface pores are the last to close, and those farthest from the surface are the first. The material, because of this banked vapor all about it, dries from the center outwardly. Not only does it dry completely, but in the case of lumber and other materials it does so without cracking or other distortion.

In the accompanying drawings which is illustrative merely, the figure is a vertical section of a type of vessel in which the process can be carried out.

In the said figure, A represents the upper chamber to contain the substances to be dried.

B, the middle part of the vessel, is the condensation-chamber, kept cool by water or other cooling medium contained in the bottom chamber C.

D is an annular chamber surrounding the major part of chamber A, intended for the heating medium, with induction and eduction ports *d* and *d'*.

A perforated division-plate E, intended to carry the material to be dried, interposes between compartments A and B, and a closed partition or bottom *e* separates chambers D and C.

F is the cover-plate, provided with gaskets *f*, arranged to close the vessel hermetically, said cover being held in place by means of bolts *h*.

G is a coil of outlet-pipe situated principally in chamber C, controlled by the valve H. Its purpose is to afford exit from the chamber B for the extracted liquid, and as arranged condensation is promoted by the effect of the cooling medium contained in chamber C. Induction and eduction ports *c* and *c'* are provided for the circulation of the cooling medium in chamber C.

The material to be dried is placed in chamber A properly supported, and it may be subdivided so that the action of applied heat over the whole mass will be facilitated. The heating medium introduced into the annular chamber D will gradually convert the liquid in the mass being dried into vapor. This vapor will remain during the whole process in contact with the substance to be dried. As the process proceeds additional moisture will be extracted and the air become supercharged with it and descend toward the lower end of the chamber. The cooling medium in chamber C promotes precipitation into the chamber B. While this precipitation will be constantly going on, there will always be held in suspension in the heated air in chamber A sufficient moisture to maintain the surface porosity of the mass being dried. This process will continue until the mass has gradually dried from the interior outwardly, the surface portion being the last to become dry. The degree of heat to be applied varies with the substances under treatment. Extraction of natural moisture, such as sap from wood, should not be carried on too rapidly nor at a high temperature, since it is important that the fibers shall not be overheated nor otherwise injured. By my process wood is practically embalmed by the slow extraction of the sap and the gradual shrinking of the material consequent to the closing of the cells. In substances like clay, marl, or others where no injury results the heat may be raised and the drying process expedited; but all heats are moderate. The reason for heating the upper part of the vessel and cooling the lower will be obvious to any one conversant with natural physical laws. The heat vaporizes the moisture, and thus it has to pass to the surface of the material. The warm air retains a portion of it in suspension, and this vapor assists to maintain the porosity of the material which it surrounds, and thus facilitates the exit of any remaining moisture. When the atmosphere becomes too heavily charged with it, there is an easy precipitation to the cool chamber B, and this continues until the material treated is substantially dry.

The interior of the vessel may have proper subdivisions or upright walls to give contact-surface for the surplus moisture, thus aiding its descent to the cool section below, and also proper subdivisions when a large body of material is being treated. In the annexed drawing I do not show such structures, as I do not limit myself to any specific construction for that purpose, since there are many obvious ways to accomplish it. The annexed drawing is illustrative merely, as the process can be carried on in a multitude of ways so long as it embraces the essential features I have described. It is further obvious that in conducting drying operations on a large scale by my system absolute hermetical sealing may be practically impossible and in many cases unnecessary. The advantage of sealing is to give better effect to natural laws of precipitation and to maintain the surface porosity of the material being dried. Minute leaks will not injuriously affect the drying operation, and I do not limit myself to a strict definition of the term "hermetically sealed," but mean a vessel practically closed against the egress of vapor.

Where my system is used without a vacuum, the bottom valve H may be left open and the liquid withdrawn as fast as precipitated and condensed.

What I claim as my invention, and desire to secure by Letters Patent, is—

1. The herein-described method of drying bodies of porous material consisting in inclosing the substance to be dried in a moisture-tight chamber and maintaining it therein under an elevated temperature saturated with the moisture evaporated and precipitating the moisture produced by evaporation by subjecting the same to a cooler temperature at a lower level, substantially as described; and continuing the process until the material is substantially dry.

2. The herein-described method of separating or extracting the moisture from solids which consists in treating the solids at an elevated temperature in a moisture-proof chamber and in the presence of an atmosphere saturated by the moisture extracted or expelled and condensing the vapor in another portion of the chamber and at a lower level; and continuing the treatment until the material is substantially dry.

3. The herein-described method of drying bodies of porous material consisting in placing the material in a chamber, closed save in its lower portion, heating the same to expel moisture therefrom, maintaining the material at an elevated temperature in a surrounding vapor, subjecting the surplus portions of the vapor to the action of a cooling agent and condensing the same at a lower level, and continuing the process until the material is substantially dry.

In testimony whereof I sign my name to this specification in the presence of two subscribing witnesses.

EMIL GATHMANN.

Witnesses:
   LOUIS GATHMANN,
   G. W. MCMULLEN.